(12) United States Patent
Khayznikov et al.

(10) Patent No.: US 11,150,112 B2
(45) Date of Patent: Oct. 19, 2021

(54) VARIABLE DIFFERENTIAL TRANSFORMER FOR POSITION MONITORING

(71) Applicant: Eaton Intelligent Power Limited, Dublin (IE)

(72) Inventors: Yuriy O. Khayznikov, Granada Hills, CA (US); Galen Chui, Pasadena, CA (US); Hai Nguyen, Rosemead, CA (US); Bhuvan Govindasamy, Ranch Santa Margarita, CA (US)

(73) Assignee: Eaton Intelligent Power Limited, Dublin (IE)

(*) Notice: Subject to any disclaimer, the term of this patent is extended or adjusted under 35 U.S.C. 154(b) by 476 days.

(21) Appl. No.: 16/061,544

(22) PCT Filed: Dec. 14, 2016

(86) PCT No.: PCT/IB2016/057630
§ 371 (c)(1),
(2) Date: Jun. 12, 2018

(87) PCT Pub. No.: WO2017/103821
PCT Pub. Date: Jun. 22, 2017

(65) Prior Publication Data
US 2020/0264013 A1 Aug. 20, 2020

Related U.S. Application Data

(60) Provisional application No. 62/267,100, filed on Dec. 14, 2015.

(51) Int. Cl.
*G01D 5/22* (2006.01)
*G01D 5/20* (2006.01)

(52) U.S. Cl.
CPC ......... *G01D 5/2291* (2013.01); *G01D 5/2013* (2013.01)

(58) Field of Classification Search
CPC .......................... G01D 5/2291; G01D 5/2013
See application file for complete search history.

(56) References Cited

U.S. PATENT DOCUMENTS 4,282,485 A * 8/1981 Pauwels ................. H01F 29/10
318/653
4,297,698 A * 10/1981 Pauwels ............... G01D 5/2291
340/870.32

(Continued)

OTHER PUBLICATIONS

International Search Report PCT/IB2016/057630, dated Apr. 5, 2017.

(Continued)

*Primary Examiner* — Paresh Patel
(74) *Attorney, Agent, or Firm* — Fishman Stewart PLLC

(57) ABSTRACT

An electronic sensor includes a signal generator configured to output a first excitation signal and a second excitation signal and a variable differential transformer connected to the signal generator to receive the first excitation signal and the second excitation signal. The variable differential transformer may include a primary coil, a first secondary coil connected to the signal generator, a second secondary coil connected to the signal generator, and a core disposed at least partially in a magnetic field generated via the first secondary coil and the second secondary coil and the first excitation signal and the second excitation signal. A phase of an output signal of the primary coil corresponds to a position of the core.

11 Claims, 7 Drawing Sheets

(56) References Cited

U.S. PATENT DOCUMENTS

| | | | |
|---|---|---|---|
| 5,777,468 A * | 7/1998 | Maher | G01D 5/2291 |
| | | | 318/657 |
| 6,239,571 B1 | 5/2001 | Shimahara | |
| 2007/0194783 A1 | 8/2007 | Brandt et al. | |
| 2011/0101968 A1 | 5/2011 | Brands et al. | |
| 2014/0132253 A1 | 5/2014 | Bertin | |

OTHER PUBLICATIONS

Measurement Specialities, Inc.—The LVDT: Construction and Principles of Operation; Rev 1/Apr. 2013; 3 pages.
Measurement Specialities, Inc.—LVDT Selection, Handling, and Installation Guidelines; Rev. 4/Aug. 2015; 10 pages.
Analog Devices—LVDT Signal Conditioner—AD598; 16 pages.
Measuring Position and Displacement with LVDTs; Published Dated: May 21, 2015; 6 pages.
Measurement Specialities, Inc.—MEAS TM LVDT Technology; Rev 1/Mar. 2013; 4 pages.
A380 Landing Gear and Systems—The feet of the Plane; DGLR—Hamburg Jun. 5, 2008; 39 pages.

\* cited by examiner

US 11,150,112 B2

VARIABLE DIFFERENTIAL TRANSFORMER FOR POSITION MONITORING

CROSS REFERENCE TO RELATED APPLICATION

This application is a National Stage Patent Application of International Patent Application No. PCT/IB2016/057630, filed Dec. 14, 2016, which claims the benefit of U.S. Provisional Application Ser. No. 62/267,100, filed Dec. 14, 2015, the contents of both are incorporated by reference in their entireties disclosure of which is hereby incorporated herein by reference in its entirety.

TECHNICAL FIELD

The present disclosure relates to methods and systems of positional monitoring, including positional monitoring using a variable differential transformer.

BACKGROUND

Positional monitoring using analog signals may require a complex signal conditioner that includes a number of components such as amplifiers, amplitude detectors, and power supplies. These components increase the complexity of using analog signals for positional monitoring, as well as decrease the reliability of using analog signals for positional monitoring due to the number of components that may fail. Additionally, using analog signals for positional monitoring may result in large errors and a low response time, which may be undesirable in applications that require high levels of accuracy and prompt response times, such as in aerospace applications.

SUMMARY

Embodiments of the present disclosure may include a positional monitoring system and method for using a variable differential transformer. An embodiment of a positional monitoring system may include a signal generator (for example, an excitation generator) and/or a variable differential transformer. A variable differential transformer may include a primary coil, a plurality of secondary coils, a core and/or a phase modulator. The signal generator may be configured to generate/output an excitation signal and/or provide or communicate an excitation signal to a variable differential transformer. The variable differential transformer may be configured to receive an excitation signal from the signal generator, excite the primary coil of the variable differential transformer with the excitation signal and/or generate a magnetic field via the primary coil. A core may be disposed at least partially in the magnetic field. The signal generator may output a plurality of secondary signals to secondary coils of the variable differential transformer. The phase modulator may be configured for processing a plurality of secondary signals into a single output signal, and a phase of the output signal may correspond to a position of the core.

An embodiment of a positional monitoring system may include a plurality of signal generators and a variable differential transformer. The variable differential transformer may include a primary coil, a plurality of secondary coils, a core, and/or a phase modulator. The plurality of signal generators may be configured to generate a plurality of excitation signals and/or provide or communicate the plurality of excitation signals to the variable differential transformer. The variable differential transformer may be configured to receive the plurality of excitation signals from the plurality of signal generators, excite the plurality of secondary coils of the variable differential transformer with the plurality of excitation signals and/or generate a magnetic field, via the secondary coils. The core may be disposed at least in the magnetic field of the variable differential transformer. The variable differential transformer may output a plurality of secondary signals from the primary coil. The phase modulator may be configured for processing the secondary signals to obtain an output signal, and/or a phase of the output signal may correspond to a position of the core.

Analyzing the phase of analog signals with a variable differential transformer may be accomplished without complicated signal processors and/or with improved positional monitoring performance.

DETAILED DESCRIPTION

Figure 1:
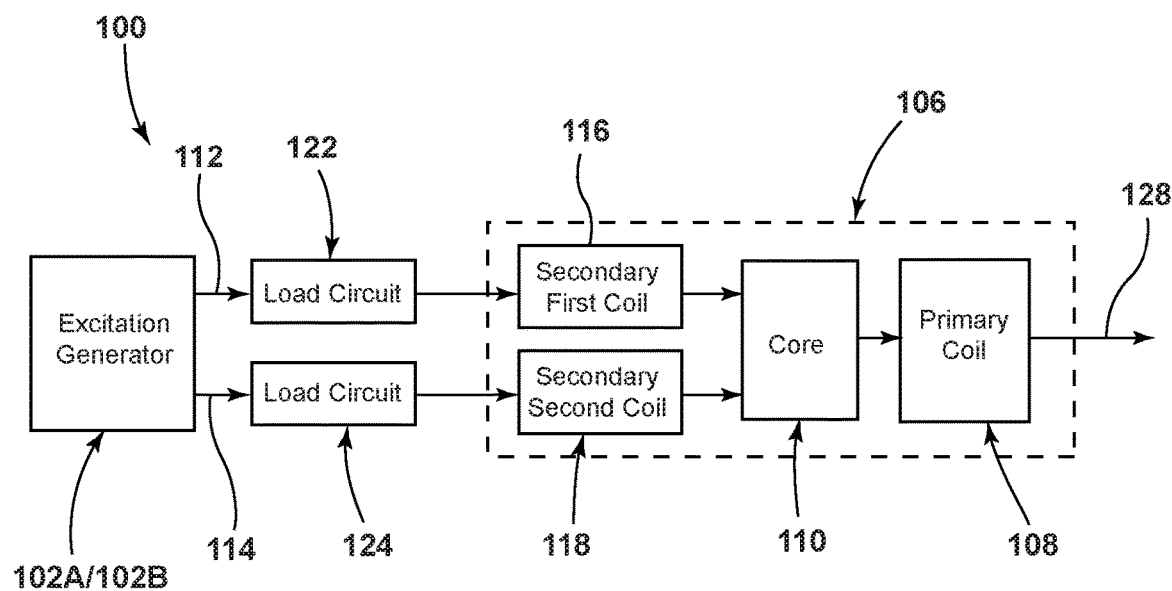
FIG. 1 is a schematic view generally illustrating an embodiment of a positional monitoring system, in accordance with teachings of the present disclosure.
Figure 2:
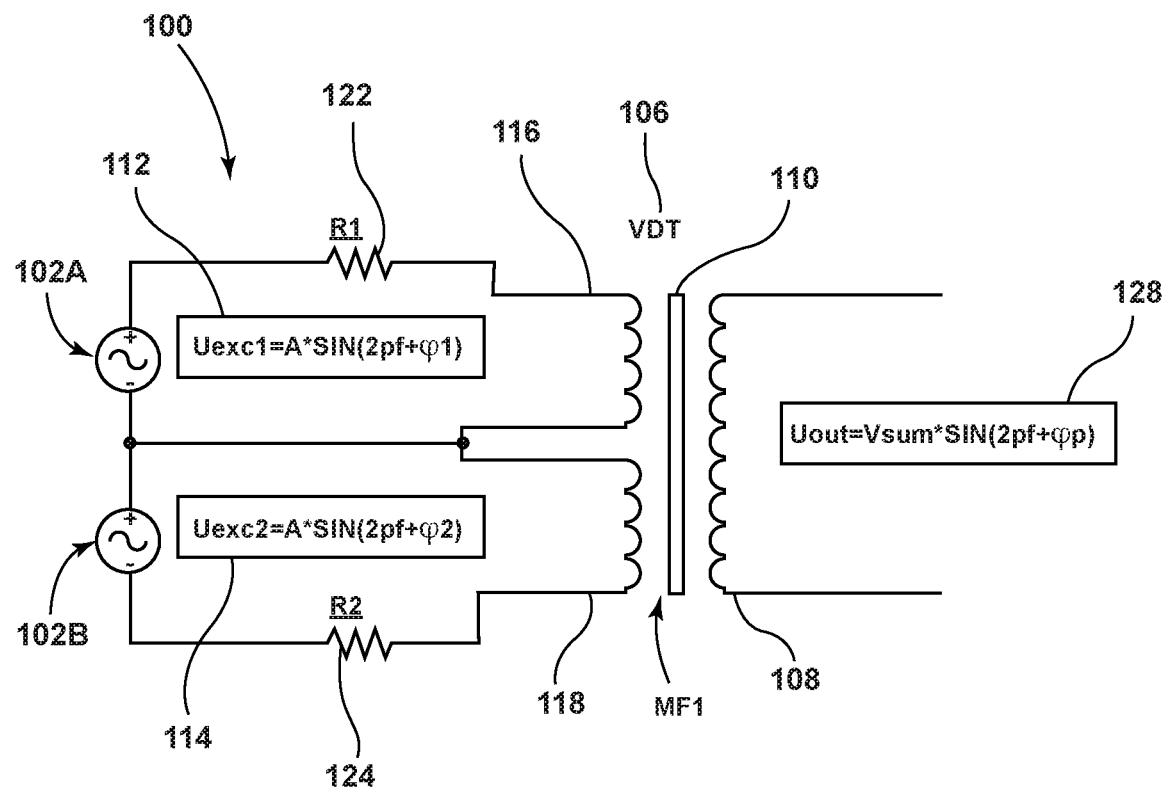
FIG. 2 is a circuit diagram generally illustrating an embodiment of a positional monitoring system, in accordance with teachings of the present disclosure.

Referring now to the drawings, FIGS. 1 and 2 generally illustrate an electronic sensor 100 (e.g., an electronic position sensor) that may include one or more excitation generators 102A, 102B, a first load circuit 122, a second load circuit 124, and/or a variable differential transformer (VDT) 106. VDT 106 may include a first secondary coil 116, a second secondary coil 118, a core 110, and/or a primary coil 108.

In embodiments, signal/excitation generator 102A and/or 102B may be configured to generate a first signal 112 (e.g., a sinusoidal signal) that may include a first phase, and/or generate a second signal 114 that may include a second phase. Although described as excitation generators 102A and 102B, electronic sensor 100 may include a single generator configured to generate/output multiple signals (e.g., simultaneously) and/or may include a plurality of generators. With embodiments, generators 102A, 102B may include constant frequency sine wave excitation generators.

In embodiments, excitation generators 102A and/or 102B may generate first signal 112 and/or second signal 114 at a constant frequency (e.g., sinusoidal signals). First secondary coil 116 of VDT 106 may be connected to first load resistor circuit 122, which may include a resistor and/or a capacitor, and may be configured to shift the phase of first signal 112 to a predetermined extent or degree. First signal 112 may pass/propagate through first load circuit 122 and may excite first secondary coil 116 of VDT 106. In embodiments, second secondary coil 118 of VDT 106 may be connected to second load resistor circuit 124, which may include a resistor and/or a capacitor, and may be configured to shift the phase of second signal 114 to a second predetermined extent or degree. Second signal 114 may pass/propagate through second load circuit 124 and may excite second secondary coil 118 of VDT 106. In embodiments, a phase difference between the phases of first signal 112 and second signal 114, which may be generated by first load resistor circuit 122 and/or second load resistor circuit 124, may not equal +/−180 degrees and/or 0 degrees (e.g., first and second signals 112, 114 may include sinusoidal signals with different phases). In embodiments, first load circuit 122 and/or second load circuit 124 may include load matching resistors.

In embodiments, a magnetic field MF1 may be generated via first secondary coil 116, such as via excitation by first excitation signal 112. VDT 106 may include a core 110 that may include, for example, a magnetic material, such as, but not limited to, a ferromagnetic alloy. Core 110 may be disposed at least partially in magnetic field MF1 and/or in functional or operative proximity to first secondary coil 116, and may affect the properties of magnetic field MF1. For example and without limitation, the position of core 110 relative to first secondary coil 116 may dictate and/or alter the properties of MF1, which may alter a single output signal 128 that may be generated in/from primary coil 108. The magnitude of a phase of single output signal 128 may relate or correspond to (e.g., increase relative to, decrease relative to, be proportional to, be inversely proportional to) the position of core 110.

Additionally and alternatively, in embodiments, magnetic field MF1 may be generated via second secondary coil 118, such as via excitation by second excitation signal 114 (e.g., magnetic field MF1 may be generated via one or both of first secondary coil 116 and second secondary coil 118). Core 110 may be in proximity of second secondary coil 118 and may affect the properties of magnetic field MF1. For example and without limitation, the position of core 110 relative to second secondary coil 118 may dictate and/or alter properties associated with MF1, which may alter single output signal 128. The magnitude of a phase of single output signal 128 may relate or correspond to (e.g., increase relative to, decrease relative to, be proportional to, be inversely proportional to) the position of core 110. In embodiments, the magnitude of the phase of single output signal 128 may include and/or correspond to a position of core 110 relative to first secondary coil 116, second secondary coil 118, and/or a combined phase of signals 112 and 114.

In embodiments, first signal 112 and/or second signal 114 may effectively be processed (e.g., combined, summed, and/or subtracted) into single output signal 128, which may be induced in primary coil 108 via magnetic field MF1. Single output signal 128 may include a phase that may correspond or relate to (e.g., increase relative to, decrease relative to, be proportional to) the position of core 110. For example, and without limitation, VDT 106 may effectively convert the position of core 110 into the phase of single output signal 128 of primary coil 108.

Figure 3:
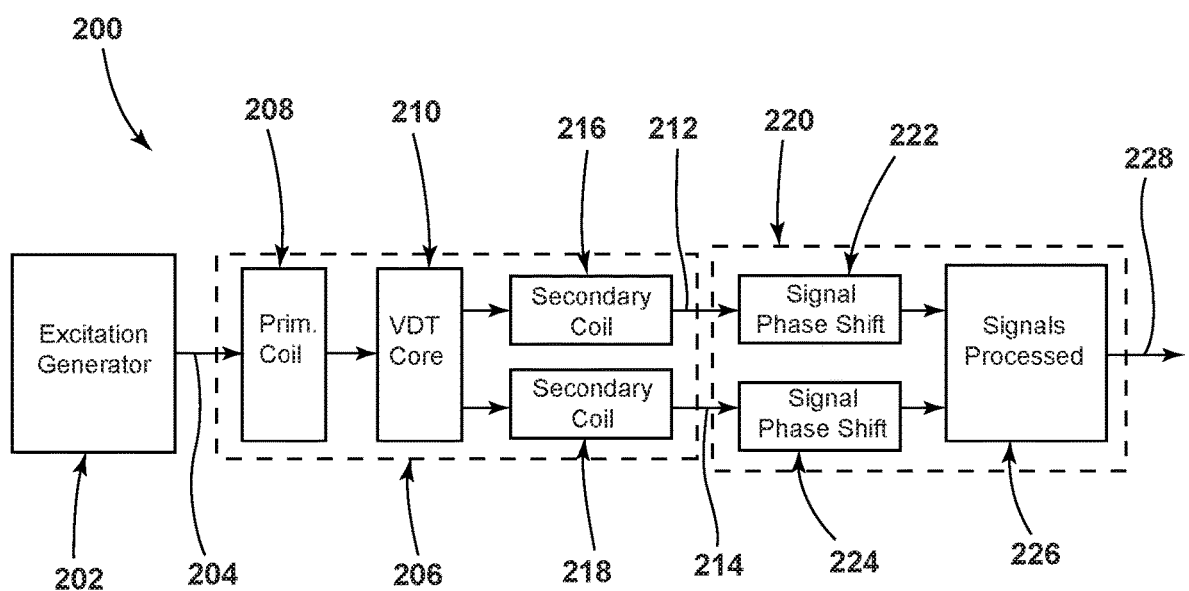
FIG. 3 is schematic view generally illustrating an embodiment of a positional monitoring system, in accordance with teachings of the present disclosure.
Figure 4:
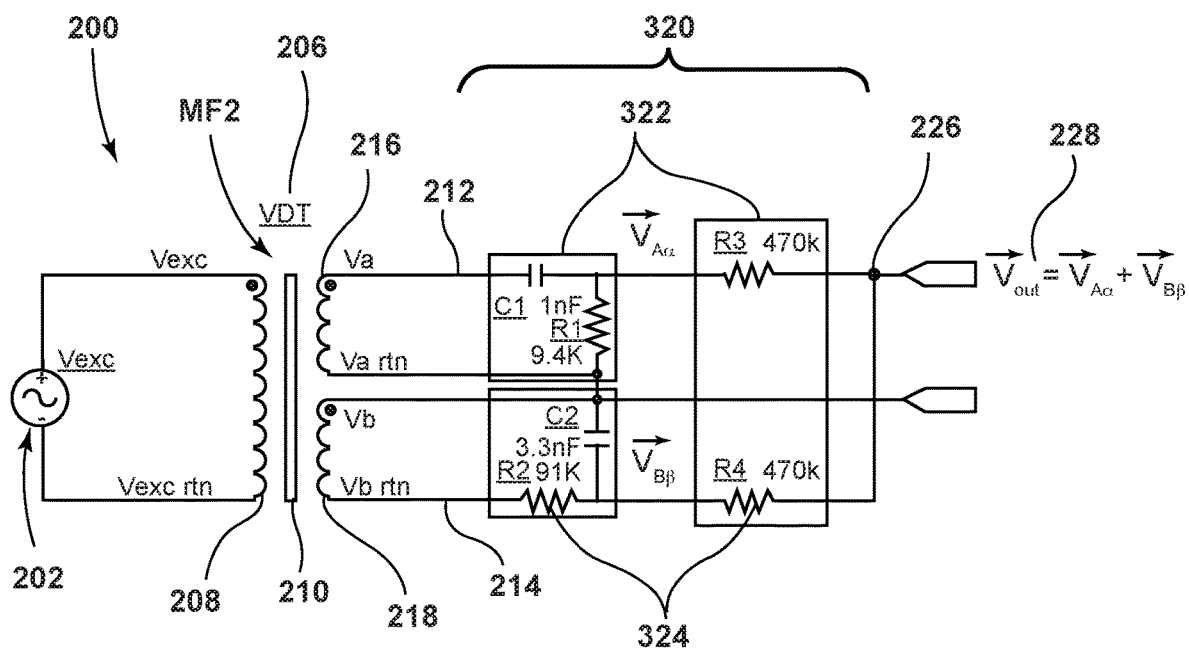
FIG. 4 is a circuit diagram generally illustrating an embodiment of a positional monitoring system, in accordance with teachings of the present disclosure.
Figure 5:
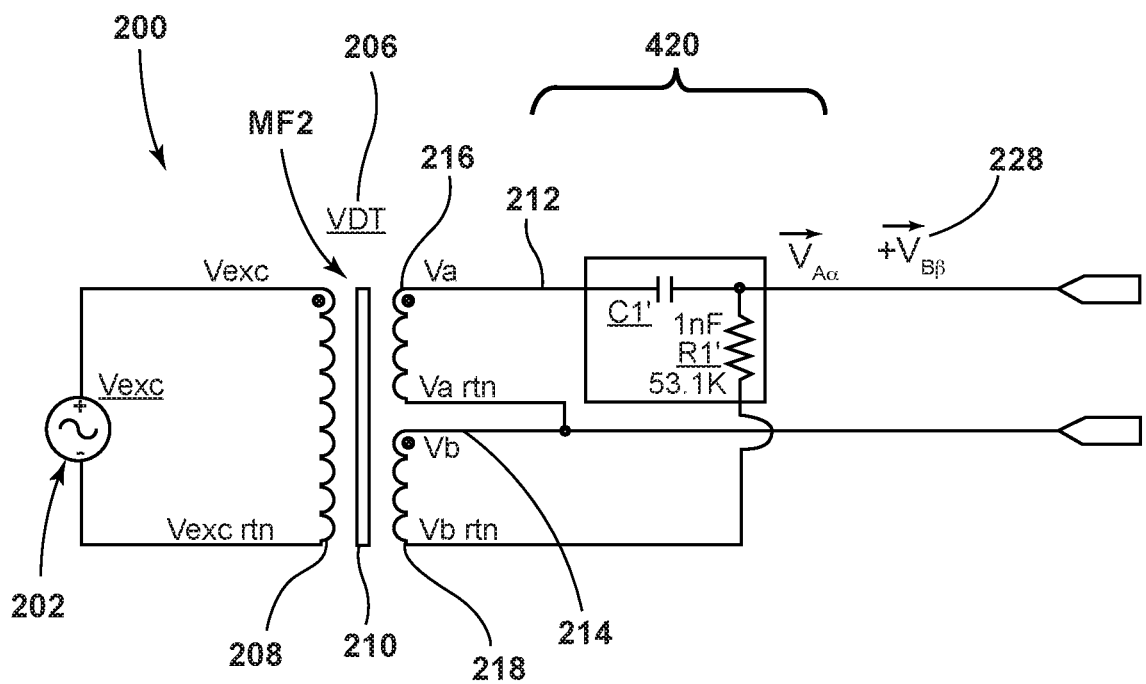
FIG. 5 is a circuit diagram generally illustrating an embodiment of a positional monitoring system, in accordance with teachings of the present disclosure.

As generally illustrated in FIGS. 3, 4, and 5, in embodiments, an electronic sensor 200 (e.g., an electronic position sensor) may include an excitation generator 202, a VDT 206, and/or a phase modulator 220. VDT 206 may include a primary coil 208, a VDT core 210, a first secondary coil 216, and/or a second secondary coil 218.

In embodiments, position sensor 200 may include signal/excitation generator 202, which may be configured to generate a signal 204 (e.g., a constant frequency sinusoidal signal) to excite primary coil 208. Signal 204 may include, for example only, a frequency of about 3 kHz. Exciting primary coil 208 with signal 204 may generate a magnetic field MF2. Magnetic field MF2 may permit a transfer of energy to first secondary coil 216 and/or second secondary coil 218. For example, and without limitation, magnetic field MF2 may correspond to (e.g., cause, result in, etc.) a first secondary signal in first secondary coil and/or a second secondary sign in second secondary coil. Core 210 may be in functional and/or operative proximity to primary coil 208 and/or magnetic field MF2 such that core 210 may affect the transfer of energy to first secondary coil 216 and/or second secondary coil 218. For example, and without limitation, the amplitude and/or phase magnitude of first secondary signal 212 and/or of second secondary signal 214 may correspond or relate to (e.g., increase relative to, decrease relative to, be proportional to, and/or be inversely proportional to) the position of core 210.

With embodiments, phase modulator 220 may be configured to process (e.g., compare and/or reference) first secondary signal 212 and/or second secondary signal 214 relative to signal 204 and/or the position of core 210.

As generally illustrated in FIG. 3, in embodiments, first secondary coil 216 of VDT 206 may be connected to a first portion 222 of phase modulator 220 that may be configured to shift the phase of first secondary signal 212 to a predetermined extent or degree. Second secondary coil 218 of VDT 206 may be connected to a second portion 224 of phase modulator 220 that may be configured to shift the phase of second secondary signal 214 to a second predetermined extent or degree. The phase-shifted first and second secondary signals 212, 214 may be combined (e.g., summed and/or subtracted) at 226 via phase modulator 220 to generate a single output signal 228. The single output signal 228 may be phase modulated according to the position of core 210 of VDT 206.

As generally illustrated in FIG. 4, in embodiments, position sensor 200 may include a phase modulator 320. In embodiments, phase modulator 320 may include a first portion 322 and a second portion 324 that may cooperate to phase shift and/or combine first secondary signal 212 and second secondary signal 214 at 226 to produce a single output signal 228. For example and without limitation, first portion 322 may include a capacitor C1 that may include capacitance of about 1 nF in series with parallel resistors R1 and R3. Resistor R1 may include, for example, a resistance of about 9.4K ohms and/or resistor R3 may include, for example, a resistance of about 470K ohms. Second portion 324 may include a resistor R2 that may include a resistance of about 91K ohms in series with a capacitor C2 that may include a capacitance of about 3.3 nF, and Capacitor C2 may be in series with a resistor R4 that many include a resistance of about 470K ohms.

In embodiments, such as generally illustrated in FIG. 5, position sensor 200 may include a phase modulator 420. In embodiments, phase modulator 420 may include a capacitor and/or resistor in series and/or parallel. For example and without limitation, phase modulator 420 may include a capacitor C1' that may include a capacitance of about 1nF and capacitor C1' may be in parallel with a resistor R1' that may include a resistance of about 53.1K ohms. First secondary coil 216 may be connected to capacitor C1' and/or second secondary coil 218 may be connected to resistor R1'. Single output signal 228 may include a combination of the outputs of capacitor C1' and resistor R1'.

In embodiments, a phase difference between first and second secondary signals 112, 114 (e.g., of sensor 100) may not equal 0 degrees or +/−180 degrees (or multiples of 180 degrees). A phase shifting between first and second secondary signals 112, 114 may determine a sensitivity of single output signal 128 to the position of core 110. With embodiments, first secondary signal 212 may be in phase with signal 204 and/or second secondary signal 214 may include an opposite phase of or may be in phase with signal 204.

In embodiments, first secondary signal 212 and second secondary signal 214 may be processed (e.g., phase shifted, combined, summed, and/or subtracted) via one or more signal processors, which may be included in a phase modulator (e.g., phase modulators 220, 320, 420), to a single output signal 228. In embodiments, a phase of single output signal 228 may be modulated by the position of core 210 of VDT 206. In embodiments, single output signal 228 may correspond to (e.g., be phase proportional to) the position of core 210 of VDT 206.

Figure 6:
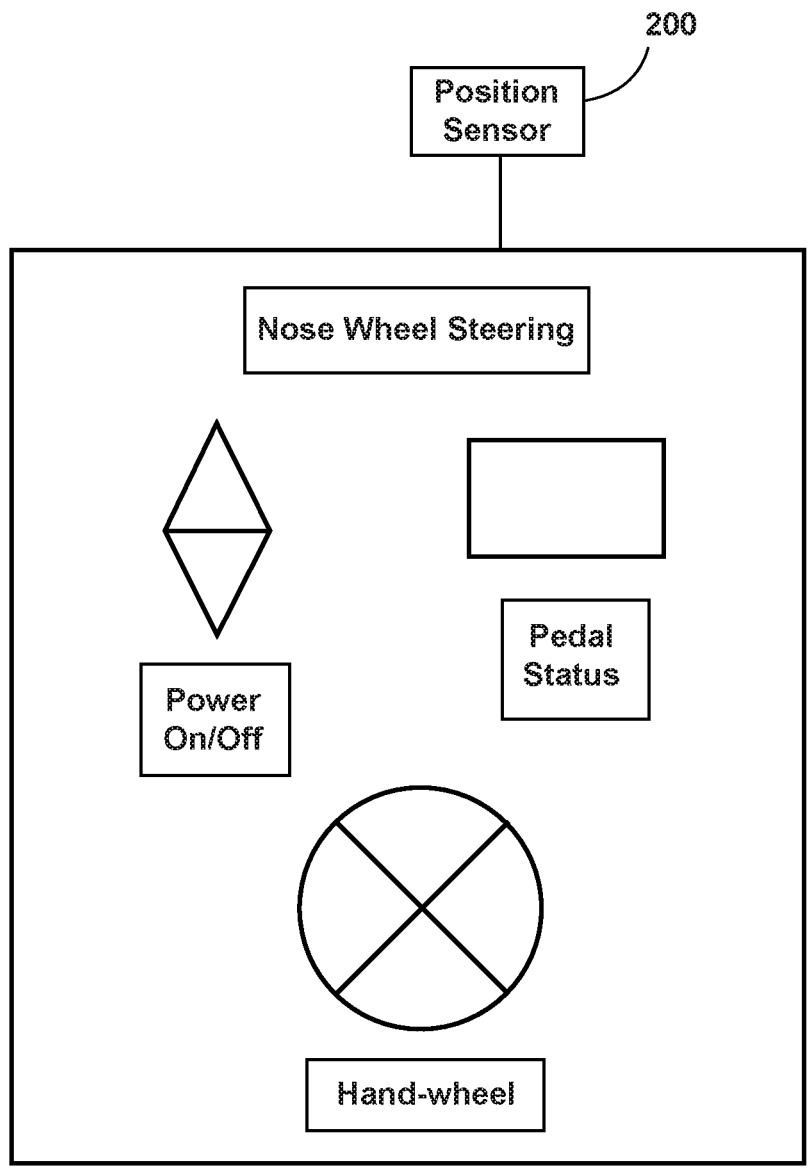
FIG. 6 is a schematic view generally illustrating an embodiment of a nose wheel control system control panel, in accordance with teachings of the present disclosure.
Figure 7:
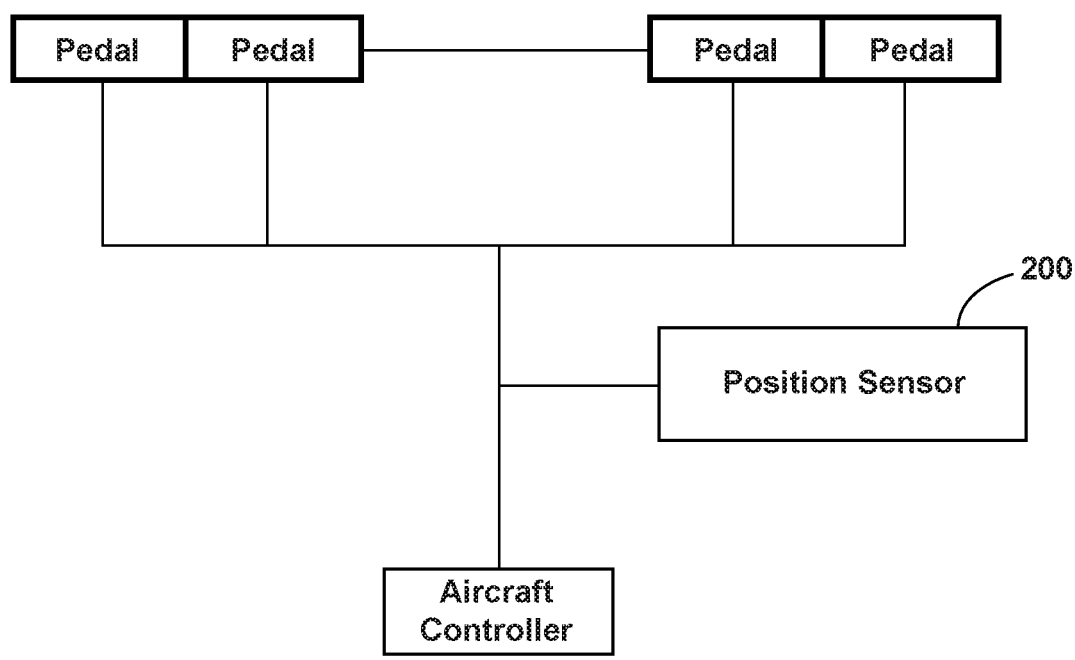
FIG. 7 is a schematic view generally illustrating an embodiment of portions of an aircraft rudder/nose wheel control system, in accordance with teachings of the present disclosure.

As generally illustrated in FIGS. 6 and 7, in embodiments, a position sensor (e.g., position sensors 100 and/or 200) may be connected to and/or correspond to a control device, for example and without limitation, a nose wheel control of an aircraft. In embodiments, the nose wheel control may, for example, include one or more of a variety of types, such as, but not limited to, rudder pedals, a tiller, knob, and/or wheel. Additionally or alternatively, and without limitation, the nose wheel control may be combined with other aircraft controls in whole or in part. The nose wheel control may be connected (e.g., mechanically and/or electrically) to a position sensor 100, 200. For example and without limitation, the nose wheel control may be connected and/or correspond to a mechanical and/or an electrical connection to a core (e.g., cores 110 and/or 210) of position sensors 100, 200.

In embodiments, the nose wheel control may be selectively activated for a period of time, during which time a position sensor 100, 200 may be energized and/or active. In embodiments, the nose wheel control may be selectively deactivated for a period of time, during which time a position sensor 100, 200 may be de-energized and/or inactive. Position sensor 100, 200 may be selectively energized as a result of one or more other factors pertaining to aircraft condition and/or performance, for example, but not limited to, aircraft speed, aircraft land gear status, auto pilot, and/or other aircraft operational systems. For example, and without limitation, the nose wheel control and one or more corresponding position sensors 100, 200 may be activated when the aircraft landing gear is extended and the nose wheel control and one or more position sensors 100, 200 may be selectively deactivated when the aircraft landing gear is retracted and/or stowed.

In embodiments, a position sensor (e.g., position sensors 100 and/or 200) may be connected to a variety of systems of an aircraft. For example, and without limitation, such control systems may include aircraft control systems and/or an aircraft controller. The single output signal (e.g., single output signals 128, 228) of position sensors 100, 200 may be communicated to such control systems of an aircraft. These control systems may interpret and/or process single output signal 128, 228 in relation to the operation of the aircraft. In embodiments, position sensors 100, 200 may include additional circuits, processors, and/or other elements to provide appropriate position monitoring for the current state of the aircraft. For example and without limitation, a large input of the nose wheel control by an operator while the nose gear is extended and the speed of the aircraft is below a certain predetermined threshold (e.g., taxiing) may result in a different position indication relative to when the speed of the aircraft is above a predetermined threshold (e.g., take-off and/or landing).

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An electronic sensor comprising:
   a signal generator configured to output a first excitation signal and a second excitation signal; and
   a variable differential transformer connected to the signal generator to receive the first excitation signal and the second excitation signal, the variable differential transformer including:
      a primary coil;
      a first secondary coil connected to the signal generator;
      a second secondary coil connected to the signal generator; and
      a core disposed at least partially in a magnetic field generated via the first secondary coil and the second secondary coil and the first excitation signal and the second excitation signal;
   a first load resistor circuit connected between the signal generator and the first secondary coil and including a resistor configured to shift a phase of the first excitation signal to a first predetermined extent; and
   a second load resistor circuit connected between the signal generator and the second secondary coil and including a resistor configured to shift a phase of the second excitation signal to a second predetermined extent;
   wherein the first predetermined extent and the second predetermined extent are different to generate a phase difference between the first excitation signal and the second excitation signal; and a phase of an output signal of the primary coil corresponds to a position of the core.

2. The electronic sensor of claim 1, wherein the first load resistor circuit and/or the second load resistor circuit include load matching resistors.

3. The electronic sensor of claim 1, wherein the first excitation signal includes a first phase and the second excitation signal includes a second phase; and a difference between the first phase and the second phase is not equal to about 0 degrees or a multiple of about 180 degrees.

4. The electronic sensor of claim 1, wherein the first excitation signal includes a constant frequency and the second excitation signal includes the constant frequency.

5. The electronic sensor of claim 1, wherein the primary coil is disposed at least partially in the magnetic field.

6. The electronic sensor of claim 1, the first excitation signal and the second excitation signal are sinusoidal with different phases.

7. A method of determining a position, the method comprising:
   generating, via a signal generator, a first excitation signal and a second excitation signal;
   passing the first excitation signal through a first load circuit including a resistor and a capacitor to shift a phase of the first excitation signal to a first predetermined extent;
   passing the second excitation signal through a second load circuit including a resistor and a capacitor to shift a phase of the second excitation signal to a second predetermined extent differing from the first predetermined extent to generate a phase difference between the first excitation signal and the second excitation signal;
   providing the first excitation signal from the first load circuit to a first secondary coil;
   providing the second excitation signal from the second load circuit to a second secondary coil;
   generating a magnetic field via the first secondary coil, the second secondary coil, the first excitation signal, and the second excitation signal;
   providing a core at least partially in the magnetic field;
   providing a primary coil at least partially in the magnetic field; and
   outputting, from the primary coil, a single output signal; and
   wherein a phase of the single output signal corresponds to a position of the core.

8. The method of claim 7, wherein the first excitation signal includes a first phase; the second excitation signal includes a second phase; and a difference between the first phase and the second phase is not equal to 0 degrees or a multiple of 180 degrees.

9. The method of claim 7, wherein the first excitation signal includes a first constant frequency and the second excitation signal includes a second constant frequency.

10. The method of claim 9, wherein the first constant frequency is the same as the second constant frequency.

11. The method of claim 7, wherein the first excitation signal and the second excitation signal are sinusoidal with different phases.

* * * * *